F. W. PARSONS AND F. A. JIMERSON.
BUILT-UP CRANK SHAFT.
APPLICATION FILED JUNE 1, 1922.
1,431,416.
Patented Oct. 10, 1922.
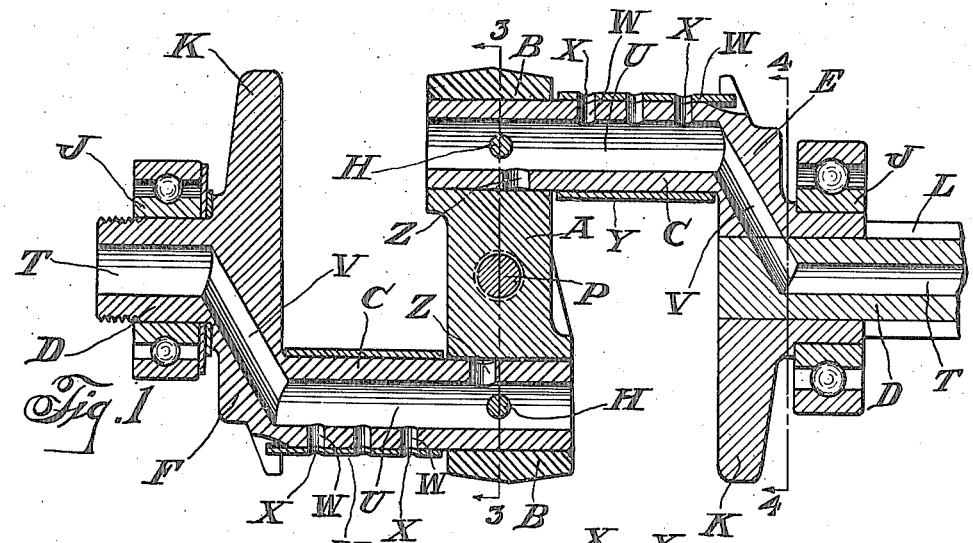
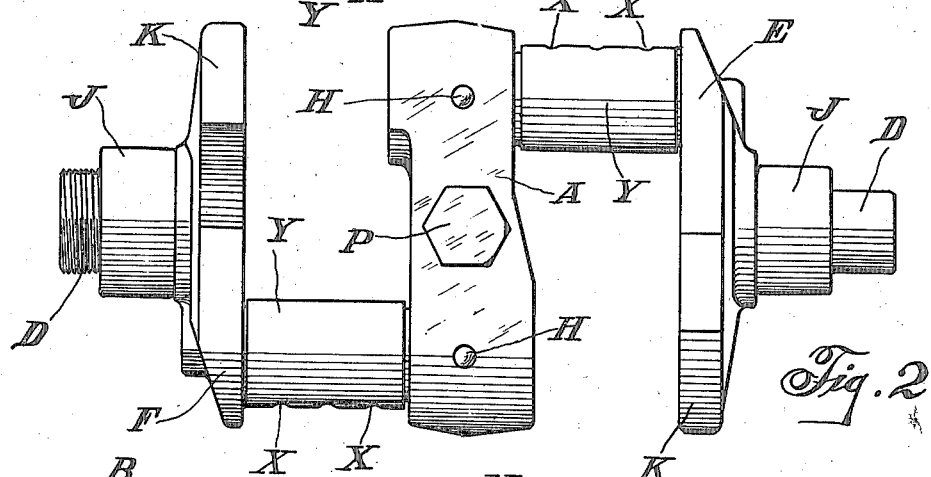
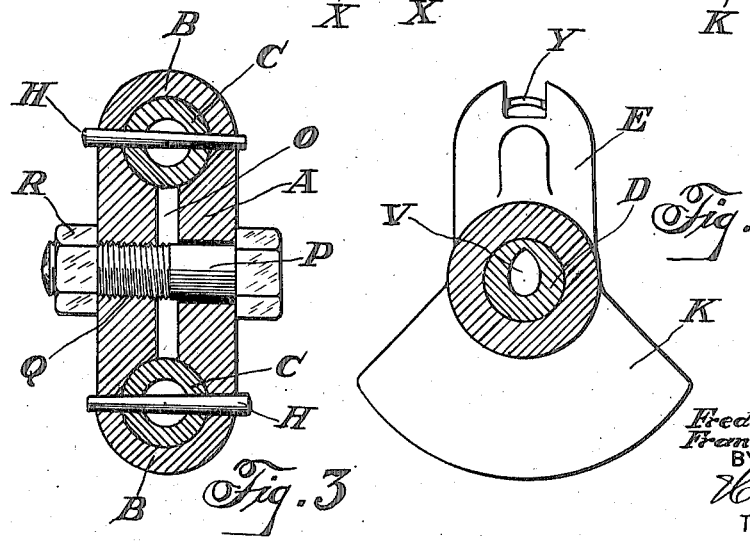
INVENTORS
Frederick W. Parsons and
Francis A. Jimerson
BY
Herbert G. Ogden
THEIR ATTORNEY Patented Oct. 10, 1922.

1,431,416

UNITED STATES PATENT OFFICE.

FREDERICK W. PARSONS, OF ELMIRA, NEW YORK, AND FRANCIS A. JIMERSON, OF ATHENS, PENNSYLVANIA, ASSIGNORS TO INGERSOLL-RAND COMPANY, OF JERSEY CITY, NEW JERSEY, A CORPORATION OF NEW JERSEY.

BUILT-UP CRANK SHAFT.

Application filed June 1, 1922. Serial No. 565,068.

*To all whom it may concern:*

Be it known that we, FREDERICK W. PARSONS, a citizen of the United States, a resident of Elmira, county of Chemung, State of New York, and FRANCIS A. JIMERSON, a citizen of the United States, a resident of Athens, county of Bradford, State of Pennsylvania, have invented a certain Built-Up Crank Shaft, of which the following is a specification accompanied by drawings.

The invention relates to built up crank shafts for fluid actuated multi-cylinder engines and the objects of the invention are to simplify and strengthen such crank shafts, obtain better balance and more perfect alignment of the bearings, and permit the use in the engine of solid end connecting rods, rather than multiple piece connecting rods or those of the toggle type. Another object of the invention is to enable the parts to be readily assembled and disassembled.

A further object of the invention is to provide passages and ducts for lubricating material in the several parts of the crank shaft, which will permit oiling of the bearings, due to the flow of fluid under pressure carrying oil through the said passages and ducts.

To all of these ends the invention is shown in the accompanying drawings in one of its preferred forms, in which—

Figure 1 is a longitudinal sectional elevation of the assembled crank shaft,

Figure 2 is a side elevation,

Figure 3 is a transverse sectional view on the line 3—3 of Figure 1, looking in the direction of the arrows, and Figure 4 is a transverse sectional view on the line 4—4 of Figure 1 looking in the direction of the arrows.

Referring to the drawings, the crank shaft comprises a center web A having transverse apertures B at each end for the reception of the crank pins C. The shaft ends D are provided with end webs E and F carrying the crank pins C, which in this instance are formed integral with the end webs. One shaft end D is also integral with the web F, but in this instance the other shaft end D is separate from the end web E and inserted in said web.

Pins H passing through the center web and crank pins locate and align the crank pins in position. The shaft ends carry the main bearings J, which are preferably ball bearings, and the end webs E and F are preferably provided with the counterweights K. One shaft end D may also be provided with the driving pinion L.

The center web A is provided with a central slot O, and a bolt P having screw threaded engagement with the portion Q of the center web, is also provided with the nut R, so that the portions of the web body may be drawn together to tightly grip and hold the crank pins C.

In accordance with this invention, the shaft ends D and the crank pin C are hollow and formed with the passages T and U for the passage of lubricating material, and the end webs E and F are each provided with an interior oil passage V connecting the hollow bores or passages T and U, respectively, of the adjacent shaft ends and crank pins, so that there is a continuous passage through each crank pin and web and shaft end for the flow of fluid under pressure carrying lubricant, as the crank shaft rotates. The walls of the crank pins are furthermore provided with radial apertures W registering with apertures X in the bearing sleeves Y. Apertures Z are also provided in the crank pins. The apertures W permit the flow of lubricant to lubricate the crank pin bearings, and the apertures Z permit additional circulation of the lubricant. In accordance with this construction, the fluid pressure in the crank case of an engine carries motive fluid together with lubricant through the passages in the shaft ends, webs and crank pins of the crank shaft, and centrifugal action carries the lubricant outwardly through the lateral apertures W in the crank pins, to the crank pin bearings.

We claim:

1. A built up crank shaft for multi-cylinder engines, comprising a center web having transverse apertures at each end, shaft ends having end webs carrying crank pins integral therewith and adapted to be inserted in the transverse apertures in the center web, said shaft ends and crank pins being hollow for the passage of lubricating material and the end webs each having an interior oil passage connecting the hollow bores of the adjacent shaft ends and crank pins, the walls of the crank pins having radial apertures, and locating means for holding and aligning the crank pins in position.

2. A built up crank shaft for multi-cylinder engines, comprising a center web having transverse apertures at each end and a central longitudinal slot in the body portion of the web connecting said apertures, shaft ends having end webs carrying crank pins integral therewith and adapted to be inserted in the transverse apertures in the center web, said shaft ends and crank pins being hollow for the passage of lubricating material and the end webs each having an interior oil passage connecting the hollow bores of the adjacent shaft ends and crank pins, the walls of the crank pins having radial apertures, locating means for holding and aligning the crank pins in position, and a bolt passing through the body portion of the web transversely to the axis of the crank shaft for drawing the two portions of the web body together and firmly locking the web body to the crank pins.

In testimony whereof we have signed this specification.

FREDERICK W. PARSONS.
FRANCIS A. JIMERSON.